(12) United States Patent
Patel et al.

(10) Patent No.: US 11,286,336 B2
(45) Date of Patent: Mar. 29, 2022

(54) LOW TEMPERATURE ANHYDRIDE EPOXY CURED SYSTEMS

(71) Applicant: Evonik Operations GmbH, Essen (DE)

(72) Inventors: Pritesh G. Patel, Breinigsville, PA (US); Gauri Sankar Lal, Whitehall, PA (US); Douglas M. La Comare, Northampton, PA (US)

(73) Assignee: Evonik Operations GmbH, Essen (DE)

( * ) Notice: Subject to any disclaimer, the term of this patent is extended or adjusted under 35 U.S.C. 154(b) by 166 days.

(21) Appl. No.: 16/468,497

(22) PCT Filed: Dec. 12, 2017

(86) PCT No.: PCT/US2017/065833
§ 371 (c)(1),
(2) Date: Jun. 11, 2019

(87) PCT Pub. No.: WO2018/111884
PCT Pub. Date: Jun. 21, 2018

(65) Prior Publication Data
US 2020/0087446 A1    Mar. 19, 2020

Related U.S. Application Data

(60) Provisional application No. 62/432,798, filed on Dec. 12, 2016.

(51) Int. Cl.
| | |
|---|---|
| C08G 59/58 | (2006.01) |
| C08G 59/42 | (2006.01) |
| C08L 63/00 | (2006.01) |
| C09D 163/00 | (2006.01) |
| C09J 163/00 | (2006.01) |
| C08J 5/24 | (2006.01) |
| C08G 59/50 | (2006.01) |
| C08G 59/64 | (2006.01) |
| C08G 59/06 | (2006.01) |

(52) U.S. Cl.
CPC ............ *C08G 59/58* (2013.01); *C08G 59/06* (2013.01); *C08G 59/4238* (2013.01); *C08G 59/4284* (2013.01); *C08G 59/4292* (2013.01); *C08G 59/5026* (2013.01); *C08G 59/5073* (2013.01); *C08G 59/64* (2013.01); *C09J 163/00* (2013.01)

(58) Field of Classification Search
None
See application file for complete search history.

(56) References Cited

U.S. PATENT DOCUMENTS

| | | | |
|---|---|---|---|
| 2,890,194 A | 6/1959 | Phillips | |
| 3,329,652 A | 7/1967 | Christie | |
| 3,489,685 A | 1/1970 | Kublicki | |
| 3,562,213 A | 2/1971 | Collis | |
| 3,746,686 A | 7/1973 | Marshall | |
| 3,839,281 A | 10/1974 | Dreher | |
| 6,441,064 B1 | 8/2002 | Shah et al. | |
| 9,080,007 B2 * | 7/2015 | Lal | C08G 59/02 |
| 2014/0243456 A1 * | 8/2014 | Lal | C08G 59/686 |
| | | | 523/466 |
| 2019/0292308 A1 | 9/2019 | Lal et al. | |

FOREIGN PATENT DOCUMENTS

| | | |
|---|---|---|
| EP | 0615994 A1 | 9/1994 |
| JP | S55050021 A | 4/1980 |

(Continued)

OTHER PUBLICATIONS

PCT International Search Report dated Mar. 29, 2018 corresponding to PCT Application No. PCT/US2017/065833 filed Dec. 12, 2017 (6 pages).

(Continued)

*Primary Examiner* — Michael J Feely
(74) *Attorney, Agent, or Firm* — Andrew H. Chung; Linda S. Li; Jason S. Ngui

(57) ABSTRACT

A curing agent composition comprising anhydride and approximately equimolar amount of tertiary amine or imidazole and carboxylic acid, the amine being 1-piperidinylethanol (N-hydroxyethyl-piperidine, NHEP) represented by the structure below or an imidazole represented by the structure below:

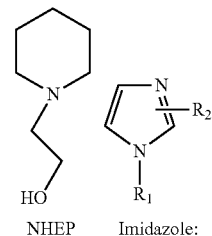

NHEP       Imidazole:

where $R_1$=H, a C1-C20 straight chain or branched alkyl, or a monocyclic aryl; $R_2$=a C1-C20 straight chain or branched alkyl, or a monocyclic aryl. The carboxylic acid is represented by RCOOH; R=a C1-C20 straight chain or branched alkyl, or a monocyclic aryl. The composition comprises a lower ratio of epoxy resin to anhydride (1:0.4-0.6) than typically used (1:0.8-1.1). In addition, it uses a higher loading of the hindered latent tertiary amine or the imidazole in combination with the carboxylic acid (wt % ratio of combined amine and carboxylic acid to anhydride ~10%). With this composition a full cure can be achieved in less than 2 hr at a significantly lower temperature (~100° C.).

12 Claims, 1 Drawing Sheet

(56) References Cited

FOREIGN PATENT DOCUMENTS

| JP | S57190018 A | 11/1982 |
|---|---|---|
| JP | H01096278 A | 4/1989 |
| JP | H01272443 A | 10/1989 |
| JP | 2005075915 A | 3/2005 |
| JP | 2015028132 A | 2/2015 |
| JP | 2016086185 A | 5/2016 |
| NL | 6900620 A | 7/1970 |
| WO | 2009089145 A1 | 7/2009 |
| WO | 2013009452 A1 | 1/2013 |
| WO | 2014165423 A1 | 10/2014 |

OTHER PUBLICATIONS

Three Bond: Technical News; Curing Agents for Epoxy Resin; Issued Dec. 20, 1990; vol. 32; (10 pages).

J. D. B. Smith; Metal Acetylacetonates as Latent Accelerators for Anhydride-Cured Epoxy Resins; Westinghouse R&D Center, Pittsburgh, Pennsylvania; Journal of Applied Polymer Science; vol. 26, 979-986; 1981 (8 pages).

\* cited by examiner

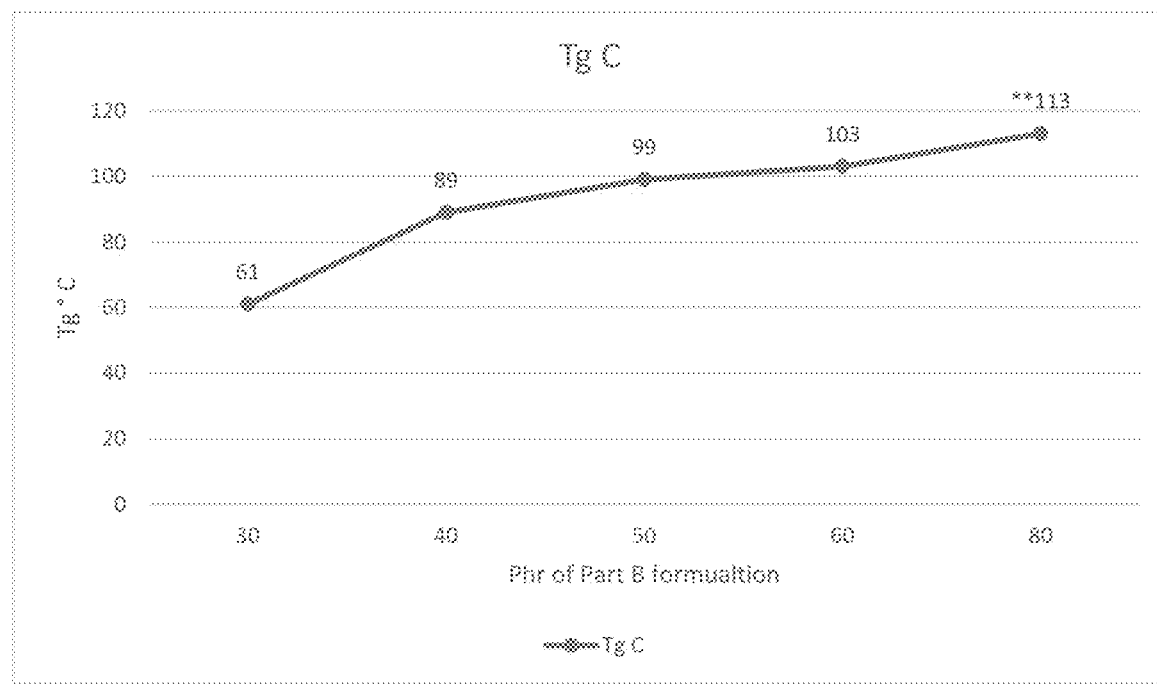
**Residual Heat (24.72 J/g) was observed after 100C 2 hr cure.

LOW TEMPERATURE ANHYDRIDE EPOXY CURED SYSTEMS

This Application is a § 371 national stage of PCT International Application No. PCT/US2017/065833, filed Dec. 12, 2017, which claims the benefit of U.S. Application No. 62/432,798, filed Dec. 12, 2016, the contents of each of which are hereby incorporated by reference in their entirety into this application.

BACKGROUND OF THE INVENTION

Anhydrides have been used as curing agents for epoxy resins since the mid-1960s. Initially there were twelve such compounds in commercial use. They possess the advantage of producing only mild skin irritation compared to amine curing agents and generally provide low viscosity and long pot life, Cured epoxy resins from anhydrides generally exhibit high temperature stability, good radiation stability as well as improved physical and electrical properties above their deflection temperature (DT). Chemical resistance to some reagents is less than with amine-cured systems, but is better against aqueous acids. As a result, epoxy-resin cured with anhydrides have been extensively used as electrical insulating materials. Anhydrides require more severe curing conditions than amine-based curing agents but are suitable for making large moldings, as they have a long pot life and form cured resins having relatively well-balanced electrical, chemical, and mechanical properties while generating a small quantity of heat. Anhydrides have been widely used as curing agents for epoxy resins for structural composite and electrical potting applications for several decades. The reaction of anhydrides with resins are dependent on a number of factors including the gel time and temperature, post-cure and post cure temperature, presence or absence of accelerators, type of accelerator, amount of hydroxyl group in the resin, ratio of anhydride to epoxy and the amount of free acid in the system. Anhydrides will not react with epoxy groups in the absence of an accelerator. Hydroxyl group from the resin or from added alcohols can catalyze the reaction but the reaction is generally slow.

Almost all commercial epoxy-resin/anhydride formulations use anhydride accelerators. These are acidic or basic compounds. Acids favor etherification while bases favor esterification. The optimum anhydride/epoxy ratio (NE) and the cured properties of the resin are determined by the accelerator used. Tertiary amines are conventionally used as anhydride accelerators. These are described in Three Bond Technical News vol. 32, Dec. 20, 1990, They include benzyldimethylamine (BDMA) and tris(dimethylaminomethyl)phenol, triethylenediamine (TEDA), N,N-dimethylpiperazine and 2-(dimethylaminomethyl)phenol. Imidazoles such as 2-methylimidazole, 2-ethyl-4-methylimidazole, 1-cyanoethyl-2-undecylimidazolium trimellitate and the epoxy-imidazole adduct (2-methylimidazole/Epon 828) have also been used.

U.S. Pat. No. 3,839,281 describes the use of N-hydroxyethyl piperidines and piperazyl compounds as accelerators for epoxy resins systems cured with anhydrides and dicyandiamide (DICY). In U.S. Pat. No. 5,650,477 quaternary ammonium salts bearing an ether linkage with a nitrile group were used as catalysts for anhydride cured epoxy resins under microwave irradiation. Solid metal acetylacetonates are described as latent curing agents in J. Appl. Poly. Sci, 26, 1981, 979 by J. Smith. These solids have the disadvantage of not being able to be dispersed adequately to effect efficient curing of epoxy resins by anhydrides. In WO 2013009452 A1, the anhydride epoxy system was cured at 80° C. for 3 h to obtain 90% conversion. The publication discloses the use of a standard epoxy: anhydride ratio, In the current system used for anhydride cured systems the following conditions are utilized:
(1) Anhydride to epoxy resin ratio is usually 1:~1 (molar ratio)
(2) Typical accelerator usage is 1-3% with active accelerators (not stable in anhydride at greater loading)
(3) Temperature of cure is ~150° C. for >4 h The major limitation of anhydrides as curing agents for epoxy resin is the fact that they require high cure temperature (>150° C.) for several hours (>4 h). Also the cured products possess poor hot wet properties which limit their use in an application in hot and wet environments. Typically anhydride active accelerators such as benzyldimethylamine (BDMA) and tris(dimethylaminomethyl)phenol (DMP-30, K54), triethylenediamine (TEDA), N,N-dimethylpiperazine and 2-(dimethylaminomethyl)phenol cannot be pre-blended at higher loading in anhydride formulation due to their rapid opening of the anhydride ring. This results in gelation in absence of epoxy resin during storage. There is a need for tertiary amine based anhydride accelerators with longer latency than the current materials in order to minimize the waste of the pre-mixed anhydride system thereby providing a significant saving in raw material cost. These latent anhydride accelerators should exhibit prolonged storage stability in admixture with anhydride curing agents and epoxy resins at ambient temperature cure. In addition, they should reduce the cycle time and thereby provide increased throughput. Furthermore, a reduction of cure temperature is necessary for lower energy use during processing as well as the reduction of hot-spots and embrittlement in the cured product. Herein we describe a new anhydride curing system which has solved most of the problems inherent in the current curing systems.

BRIEF SUMMARY OF THE INVENTION

The composition of this invention uses a lower ratio of epoxy resin to anhydride (1:0.4-0.6) than typically used (1:0.8-1.1), In addition, it uses a higher loading of a hindered latent tertiary amine or an imidazole in combination with a carboxylic acid (wt % ratio of combined amine and carboxylic acid to anhydride ~10%). With this formulated system a full cure can be achieved in less than 2 h at a significantly lower temperature (~100° C.).

The amine used for this invention is 1-piperidinylethanol (N-hydroxyethyl-piperidine, NHEP) represented by the structure below or an imidazole represented by the structure below:

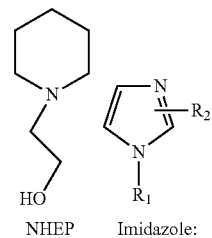

NHEP     Imidazole:

$R_1$=H, a C1-C20 straight chain or branched alkyl, or a monocyclic aryl; $R_2$=a C1-C20 straight chain or branched alkyl, or a monocyclic aryl.

The carboxylic acid is represented by RCOOH; R=a C1-C20 straight chain or branched alkyl, or a monocyclic aryl.

BRIEF DESCRIPTION OF THE DRAWINGS

FIG. 1 is a graph showing the Tg (° C.) for different ratios of epoxy to anhydride (Phr) packages.

DETAILED DESCRIPTION OF THE INVENTION

In order to overcome the above limitations, we have found that when the anhydride formulation contains approximately 10% of the N-hydroxyethylpiperidine (NHEP) or imidazole salts based liquid latent accelerator and the ratio of epoxy to anhydride is significantly lower than conventional (1:0.8-1) vs. ours (1:0.4-0.6), the full conversion of the formulation can be achieved at 100° C. in <2 h. These conditions give the optimum cured performance to meet the structural processing and application needs. For this concept we have used methylhexahydrophthalic anhydride (MHHPA) and nadic methyl anhydride (NMA). However, this can be applied to other mono and di-carboxylic acid anhydrides that are used in industry to cure epoxy resins.

Representative carboxylic acids are acetic acid, propanoic acid, hexanoic acid, 2-ethyl-hexanoic acid, decanoic acid, tall oil fatty acid (TOFA), as well as a dicarboxylic or tricarboxylic acid. For a dicarboxylic acid two mole equivalents of the amine is used with one mole equivalent of the acid while with tricarboxylic acid three mole equivalents of the amine with one equivalent of the acid.

These catalysts may be used in a composition consisting of an anhydride curing agent and an epoxy resin. Suitable epoxy resins include the following:

Epoxy resins commercially available under the trade name DER 383 (available from Dow) and EPON 826 (available from Hexion Specialty Chemicals) are suitable for this application.

Other epoxy resins may include, but are not limited to, bi-functional epoxies, such as, bisphenol-A and bisphenol-F resins. Multifunctional epoxy resin, as utilized herein, describes compounds containing two or more 1,2-epoxy groups per molecule. Epoxide compounds of this type are well known to those of skill in the art and are described in Y. Tanaka, "Synthesis and Characteristics of Epoxides", in C. A. May, ed., Epoxy Resins Chemistry and Technology (Marcel Dekker, 1988), which is incorporated herein by reference.

One class of epoxy resins suitable for use in the present disclosure comprises the glycidyl ethers of polyhydric phenols, including the glycidyl ethers of dihydric phenols, Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol-F, and which may contain varying amounts of 2-hydroxyphenyl isomers), and the like, or any combination thereof. Additionally, advanced dihydric phenols of the following structure also are useful in the present disclosure:

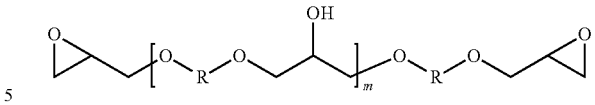

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present disclosure. In other embodiments, the epoxy component may be a polyglycidyl amine from one or more of 2,2'-methylene dianiline, m-xylene dianiline, hydantoin, and isocyanate.

The epoxy component may be a cycloaliphatic (alicyclic) epoxide. Examples of suitable cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, vinylcyclohexene diepoxides; limonene diepoxide; bis(3,4-epoxycyclohexylmethyl)pimelate; dicyclopentadiene diepoxide; and other suitable cycloaliphatic epoxides. Other suitable diepoxides of cycloaliphatic esters of dicarboxylic acids are described, for example, in WO 2009/089145 A1, which is hereby incorporated by reference.

Other cycloaliphatic epoxides include 3,3-epoxycyclohexylmethyl-3,4-epoxycyclohexane carboxylate such as 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexyl-methyl-3,4-epoxy-3-methylcyclohexane carboxylate. Other suitable 3,4-epoxycyclohelmethyl-3,4-epoxycyclohexane carboxylates are described, for example, in U.S. Pat. No. 2,890,194, which is hereby incorporated by reference. In other embodiments, the epoxy component may include polyol polyglycidyl ether from polyethylene glycol, polypropylene glycol or polytetrahydrofuran or combinations thereof.

Suitable anhydrides include linear polymeric anhydrides such as polysebacic and polyazelaic anhydride. Alicyclic anhydrides such as methyltetrahydrophthalic anhydride (MTHPA), tetrahydrophthalic anhydride, nadic methyl anhydride (NMA), hexahydrophthalic anhydride (HHPA), and methylhexahydrophthalic anhydride (MHHPA). Simple alicyclic anhydrides such as succinic anhydride, substituted succinic anhydride, citric acid anhydride, maleic anhydride and special adducts of maleic anhydride, dodecyl succinic anhydride, dodecenylsuccinic anhydride (DDSA), maleic anhydride vinyl and styrene copolymers of maleic anhydride, multi-ring alicyclic anhydrides and aromatic anhydride such as phthalic anhydride and trimellitic anhydride.

The compositions of this invention may contain from about 0.4 to about 0.6 equivalents of anhydride curing agents per equivalent of epoxy and preferably from 0.5 to 0.6 equivalents. The accelerator may suitably be employed in a ratio of about 1-40 parts per hundred parts of curing agent. In another embodiment, the accelerator may suitably be employed in a ratio of about 1-20 parts per hundred parts of curing agent. In yet another embodiment, the accelerator may suitably be employed in a ratio of about 1-10 parts per hundred parts of curing agent. In contrast to standard epoxy:anhydride ratio (1:0.8-1), which is commonly used in such formulations for structural laminates and composites applications, the proposed approach only contains 0.4-0.6 part of anhydride curing agent to 1 part of epoxy resin.

The advantages we believe this technology would bring are as follows:
1) It will allow fabricators to lower the cure temperature and time (150° C. for 6 hrs to 100° C. for 2 hrs) for applications such as Pultrusion.
2) Minimize or eliminate the failure of anhydride formulation under a cyclic load due to micro stress when it is cured at lower temp (100° C.) for VARTM-syntactic.
3) Improve overall EH&S performance in contrast to where amines are used.
4) Provide a new formulating tool to offer where long pot life low exotherm is required.

Aspects of the present invention are, for example, as follows

<1> A curing agent composition for epoxy resin comprising anhydride and approximately equimolar amount of tertiary amine or an imidazole and carboxylic acid.
<2> The curing agent composition according to <1> wherein the weight ratio of anhydride to combined tertiary amine or imidazole and carboxylic acid is 95:5.
<3> The curing agent composition according to <1> wherein the weight ratio of anhydride to combined tertiary amine or imidazole and carboxylic acid is 50:50.
<4> A composition comprising the curing agent according to <1> and epoxy resin.
<5> The composition according to <4> where the epoxy to anhydride weight ratio is 1:0.4-0.6.
<6> The composition according to <5> wherein the temperature for curing the composition ranges from 80 C to 100 C for 1-2 hrs.
<7> The composition according to any of <4> to <6> wherein the epoxy resin is a liquid epoxy resin or a multi-functional epoxy resin.
<8> The composition according to any of <4> to <6> wherein the epoxy resin comprises at least one glycidyl ether selected from the group of glycidyl ethers of: resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane, bis-(4-hydroxyphenyl)-methane, and combinations thereof.
<9> The curing composition according to any of <1> to <3> wherein the anhydride is selected from the group consisting of methylhexahydrophthalic anhydride (MHHPA), nadic methyl anhydride (NMA), dodecenylsuccinic anhydride (DDSA), methyltetrahydrophthalic anhydride (MTHPA), hexahydrophthalic anhydride (HHPA).
<10> The composition according to any of <4> to <8> further comprising an additive selected from the group consisting of epoxy tougheners, inorganic nano and micro fillers.
<11> Use of the composition according to any of <4> to <7> wherein the use is selected from the group consisting of adhesives and composite structural parts.
<12> The composition according to any of <4> to <7> wherein the composition is made from a process selected from the group consisting of resin transfer molding (RTM), high pressure resin transfer molding (HP RTM), light resin transfer molding (LRTM), compression molding (CM), resin infusion, filament winding, casting, pultrusion, molding, and combinations thereof.
<13> The composition according to <1> in which the tertiary amine or an imidazole in combination with a carboxylic acid is N-hydroxyethylpiperidine or an imidazole represented by the structure below:

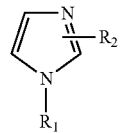

where $R_1$=H, a C1-C20 straight chain or branched alkyl, or a monocyclic aryl; and
$R_2$=a C1-C20 straight chain or branched alkyl, or a monocyclic aryl.
<14> The composition according to <13> wherein the carboxylic acid is represented by RCOOH; R=a C1-C20 straight chain or branched alkyl, or a monocyclic aryl.

EXAMPLES

Example 1

General Procedure for Preparation of a Low Temperature Anhydride Cure System.

The novel low temperature cure system was prepared by adding NHEP (19 gms) and cyclohexanedimethyl amine (28 gms) into a 3-neck round bottom flask equipped with an overhead mechanical stirrer and nitrogen inlet and thermocouple. The ethyhexanoic acid (58 gms) was added slowly to maintain the temperature at 25-30° C. for 1 hour. Once salt is formed, methylhexahydrophthalic anhydride (MHHPA) (900 gms) was added slowly to maintain the temp. ~25-30° C. over a period of 30 mins. On completion, epoxy (2000 gms) was added at room temperature and the whole mixture was stirred for 10 mins to make low temperature anhydride system. Thermal study was conducted using DSC to understand the cure kinetics, reactivity and Tg. Latency study was determined using Brookfield viscometer with Wingather software to generate viscosity cure profile. The mechanical properties such as tensile, flexural and compression were tested according to ASTM methods using Instron machine.

Example 2

General Procedure for Preparation of a Low Temperature Anhydride Cure System,

The novel low temperature cure system was prepared by adding Imidazole (32 gms) into a 3-neck round bottom flask equipped with an overhead mechanical stirrer and nitrogen inlet and thermocouple. The octanoic acid (68 gms) was added slowly to maintain the temperature at 25-30° C. for 1 hour. Once salt is formed, methylhexahydrophthalic anhydride (MHHPA) (900 gms) was added slowly to maintain the temp. ~25-30° C. over a period of 30 mins. On completion, epoxy (2000 or 2250 gms) was added at room temperature and the whole mixture was stirred for 10 mins to make low temperature anhydride system. Thermal study was conducted using DSC to understand the cure kinetics, reactivity and Tg. Latency study was determined using Brookfield viscometer with Wingather software to generate viscosity cure profile. The mechanical properties such as tensile, flexural and compression were tested according to ASTM methods using Instron machine.

Example 3

The novel low temperature cure systems were prepared by adding 1-methyl imidazole (AMI-1) (36.44 gms) into a 3-neck round bottom flask equipped with an overhead mechanical stirrer and nitrogen inlet and thermocouple. The octanoic acid (63.66 gms) was added slowly to maintain the temperature at 25-30° C. for 1 hour. Once salt was formed, the anhydride (MHHPA) (900 gms) was added slowly to maintain the temp. ~25-30° C. over a period of 30 mins. On completion, epoxy (2250 gms) was added at room temperature and the whole mixture was stirred for 10 mins to make low temperature anhydride system. Thermal study was conducted using DSC to understand the cure kinetics, reactivity and Tg. Latency study was determined using Brookfield viscometer with Wingather software to generate viscosity cure profile. The mechanical properties such as tensile, flexural and compression were tested according to ASTM methods using Instron machine.

Differential Scanning Calorimetric (DSC) Study of Anhydride Accelerators

The methylhexahydrophthalic anhydride (54 g) (containing the anhydride accelerator) and bisphenol A diglycidyl ether resin (100 g) were mixed using a stainless steel spatula until a uniform mixture was obtained. A sample of this mixture was analyzed by DSC (TA Instruments QA20) using a program that starts at 25° C. and heats at 10° C./minute up to 300° C., cools and scans a second time to 250° C. The first scan provides cure data including onset temperature, peak exotherm and heat of reaction, while the second scan confirms the glass transition temperature.

Example 4

Latency Study of Anhydride Accelerators

The salts prepared in example 1 were analyzed for latency. Pot life of each system was measured by Brookfield viscometer which was connected to a laptop computer using the Brookfield Wingather program. The viscosity versus time and temperature were recorded.

TABLE 1

| Formulation | phr | cure schedule | Isothermal DSC (° C.) | | | Tg ° C. | time to 10K (mins) | time to 250K (mins) |
| --- | --- | --- | --- | --- | --- | --- | --- | --- |
| | | | onset | peak | heat of rxn | | | |
| 90:10 MHHPA:A2910 | 80 | 65 C.- 2 hrs | 103 | 132 | 193.9 | 111 | ND | ND |
| 80:20 MHHPA:A2910 | 80 | 65 C.- 2 hrs | 87 | 127 | 106.7 | 84 | ND | ND |
| 70:30 MHHPA:A2910 | 80 | 65 C.- 2 hrs | 90 | 125 | 50.9 | 62 | ND | ND |
| 60:40 MHHPA:A2910 | 80 | 65 C.- 2 hrs | 86 | 132 | 36.11 | 44 | ND | ND |
| 50:50 MHHPA:A2910 | 80 | 65 C.- 2 hrs | 120 | 121 | 39.72 | 25 | ND | ND |

ND: No Data & NO: Not observe
A2910—Ancamine A2910
Ancamine is a registered trademark of Evonik Corp.

The purpose of this experiment was to understand the cure conversion at lower temp and optimum Tg of the cure material. In order to achieve complete cure at lower temp. (65 C –2 hrs) the above formulations were prepared to study the effect of cure conversion using Isothermal DSC. The anhydride to accelerator loading was varied from 90:10-50:50. The typical phr for epoxy anhydride used was 100:80. The results of DSC shows that there was residual heat of reaction for each combination in Table 1 which is an indication of incomplete cure. The conclusion of this experiment was cure temp. should be higher than 65 C. It is worthy of note that the accelerator used for this concept allows use at higher loading without impacting physical form (e.g. viscosity) of curing package. e.g. other accelerators for anhydride epoxy cure cannot be used>5% in the anhydride. At higher loading these accelerators (e.g. K-54, A1110, BDMA, Lindax-1) cause instability of the curing agent formulation and result in a rapid buildup in viscosity in absence of epoxy resin,

TABLE 2

| Formulations | Phr | Cure schedule | Isothermal DSC (° C.) | | | Tg° C. | Time to 10K (mins) | Time to 250K (mins) |
| --- | --- | --- | --- | --- | --- | --- | --- | --- |
| | | | Onset | Peak | Heat of rxn | | | |
| 90:10 MHHPA:A2910 | 80 | 100 C.- 2 hrs | 122 | 139 | 19.91 | 116/113 | ND | ND |
| 80:20 MHHPA:A2910 | 80 | 100 C.- 2 hrs | 114 | 146 | 6.32 | 100/85 | ND | ND |

The second experiment was conducted at a higher temp. 100 C and cure time was kept the same to understand the effect of temp. on cure conversion and Tgs. The results of DSC are shown in Table 2. The Tg was improved when cured at higher temp (100 C), however there was still residual exotherm observed which indicated cure was not complete. It is important to achieve complete cure in order to obtain cured product that is stable to high temperature, water and other chemicals. Latter conditions result in deterioration of the cure network that result in failure of the cure product during its service,

TABLE 3

| Formulations | Phr | Cure schedule | Isothermal DSC (° C.) | | | | Time to 10K (mins) | Time to 250K (mins) |
|---|---|---|---|---|---|---|---|---|
| | | | Onset | Peak | Heat of rxn | Tg° C. | | |
| 90:10 MHHPA:A2910 | 60 | 100 C.-2 hrs | NO | NO | NO | 103/108 | 545 | 905 |
| 80:20 MHHPA:A2910 | 60 | 100 C.-2 hrs | NO | NO | NO | 91/98 | 211 | 415 |

In the third experiment, the stoichiometry of the anhydride curing package relative to epoxy resins was changed from 1:0:8 to 1:0.6 to check if complete cure can be obtained having less amount of curing agent. As shown in Table 3, lesser amount of curing agent (0.6) resulted in full conversion of formulation when cured at 100 C for 2 hrs. (e.g. no residual exotherm was observed using DSC). The Tg of the 90:10 package was better than the 80:20 package, so for further study we used the 90:10 package formulation.

TABLE 4

| Formulations | Phr | Cure schedule | Isothermal DSC (° C.) | | | | Time to 250K (mins) |
|---|---|---|---|---|---|---|---|
| | | | Onset | Peak | Residual Heat of rxn (J/g) | Tg° C. | |
| 98:2 MHHPA:BDMA | 80 | 100 C.-2 hrs | 123 | 149 | 24.72 | 113 | 500 |
| 98:2 MHHPA:BDMA | 80 | 150 C.-6 hrs | NO | NO | NO | 140 C. | 500 |
| 90:10 MHHPA:A2910 | 30 | 100 C.-2 h | NO | NO | NO | 61 | 833 |
| 90:10 MHHPA:A2910 | 40 | 100 C.-2 h | NO | NO | NO | 89 | 795 |
| 90:10 MHHPA:A2910 | 50 | 100 C.-2 h | NO | NO | NO | 99 | 845 |
| 90:10 MHHPA:A2910 | 60 | 100 C.-2 h | NO | NO | NO | 103 | 905 |

The purpose of the next experiment was to determine the optimum ratio of epoxy to anhydride package. The results of DSC are shown in Table 4. The results show that optimum Tg and full conversion was obtained with the ratio of 100 part of epoxy:60 part of anhydride package. The pot life was not significantly changed in spite of a higher ratio of accelerator to anhydride. In the traditional anhydride cure epoxy system, the accelerator is generally used between 1-4%. The Tg (° C.) for different ratios of epoxy to anhydride (Phr) packages is shown in FIG. 1.

Dynamic DSC

Example 5

The formulations described in the table below were mixed with bisphenol A diglycidyl ether resin (ratio of formulation to epoxy resin in range of 40-50 g:100 g resin) using a stainless steel spatula until a uniform mixture was obtained. A 2 mg sample of this mixture was analyzed by using a commercially available DSC (TA Instruments QA20) having a software program embedded in the DSC that starts at 25° C. and heats at 10° C./minute up to 300° C., cools and scans a second time to 250° C. The first scan provides cure data including onset temperature, peak exotherm and heat of reaction, while the second scan confirms the glass transition temperature.

TABLE 5

| Formulations | Phr | Cure schedule | Isothermal DSC (° C.) | | Heat of rxn | Tg° C. | Time to 250K (mins) |
| --- | --- | --- | --- | --- | --- | --- | --- |
| | | | Onset | Peak | | | |
| 90:3.6:6.4 MHHPA:AMI-1:octanoic acid | 40 | 100 C.-2 h | 121 | 142 | 29 | 114 | NO |
| 90:3.6:6.4 MHHPA:AMI-1:octanoic acid | 50 | 100 C.-2 h | 123 | 141 | 25 | 115 | NO |
| 95:1.8:3.2 MHHPA:AMI-1:octanoic acid | 40 | 100 C.-2 h | 122 | 146 | 10 | 105 | NO |
| 95:1.8:3.2 MHHPA:AMI-1:octanoic acid | 50 | 100 C.-2 h | 119 | 144 | 25 | 112 | NO |

TABLE 6

| Formulations | Phr | Cure schedule | Isothermal DSC (° C.) | | Heat of rxn | Tg° C. | Time to 250K (mins) |
| --- | --- | --- | --- | --- | --- | --- | --- |
| | | | Onset | Peak | | | |
| 90:3.2:6.8 MHHPA:Non-sub-Imd:octanoic acid | 40 | 100 C.-2 h | 124 | 144 | 8.9 J/g | 121 | NO |
| 90:3.6:6.4 MHHPA:AMI-1:octanoic acid | 50 | 100 C.-2 h | — | — | — | 124 | NO |
| 95:1.6:3.4 MHHPA:Non-sub-Imd:octanoic acid | 40 | 100 C.-2 h | 125 | 145 | 34.72 | 117 | NO |
| 95:1.6:3.4 MHHPA:Non-sub-Imd:octanoic acid | 50 | 100 C.-2 h | 123 | 143 | 26.6 | 100 | NO |

TABLE 7

| | | | Mechanical Properties | | |
| --- | --- | --- | --- | --- | --- |
| Formulation | Phr | Cure schedule | Flexural Strength (psi) | Flexural Modulus (ksi) | ILLS (psi) |
| 98:2 MHHPA:A2910 | 80 | 150 C. for 6 hrs | 160,604 | 6,342 | 7,738 |
| 90:10 MHHPA:A2910 | 60 | 100 C. for 2 hrs | 150,985 | 6,121 | 6,535 |

The invention claimed is:

1. A curing agent composition for epoxy resin comprising: a carboxylic acid anhydride; and a component comprising approximately equimolar amounts of tertiary amine and carboxylic acid or approximately equimolar amounts of an imidazole and carboxylic acid, wherein the weight ratio of carboxylic acid anhydride to combined tertiary amine and carboxylic acid or combined imidazole and carboxylic acid is 50:50.

2. The curing agent composition of claim 1 wherein the carboxylic acid anhydride is selected from the group consisting of methylhexahydrophthalic anhydride (MHHPA), nadic methyl anhydride (NMA), dodecenylsuccinic anhydride (DDSA), methyltetrahydrophthalic anhydride (MTHPA), and hexahydrophthalic anhydride (HHPA).

3. The curing agent composition of claim 1 in which the tertiary amine is N-hydroxyethylpiperidine or the imidazole is represented by the structure below:

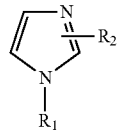

where $R_1$=H, a C1-C20 straight chain or branched alkyl, or a monocyclic aryl; and $R_2$=a C1-C20 straight chain or branched alkyl, or a monocyclic aryl.

4. The curing agent composition of claim 3 wherein the carboxylic acid is represented by RCOOH; R=a C1C20 straight chain or branched alkyl, or a monocyclic aryl.

5. A composition comprising the curing agent of claim 1 and epoxy resin.

6. The composition of claim 5 where the epoxy to carboxylic acid anhydride equivalent weight ratio is 1: 0.4-0.6.

7. The composition of claim 5 wherein the composition is capable of being cured at a temperature ranging from 80° C. to 100° C. for 1-2 hrs.

8. The composition of claim 4 wherein the epoxy resin is a liquid epoxy resin or a multifunctional epoxy resin.

9. The composition of claim 4 wherein the epoxy resin comprises at least one glycidyl ether selected from the group consisting of glycidyl ethers of: resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane, bis-(4-hydroxyphenyl)-methane, and combinations thereof.

10. The composition of claim 5 further comprising an additive selected from the group consisting of epoxy tougheners, inorganic nano and micro fillers.

11. An article of manufacture comprising the composition of claim 5, wherein the article is selected from the group consisting of an adhesive and a composite structural part.

12. An article of manufacture comprising the composition of claim 5 wherein the article is made from a process selected from the group consisting of resin transfer molding (RTM), high pressure resin transfer molding (HP RTM), light resin transfer molding (LRTM), compression molding (CM), resin infusion, filament winding, casting, pultrusion, molding, and combinations thereof.

\* \* \* \* \*